Patented July 18, 1933

1,918,589

UNITED STATES PATENT OFFICE

BENJAMIN RUBIN BURGESS, OF GLENDALE, CALIFORNIA

PROCESS OF PRODUCING A FUMIGATING AGENT

No Drawing.   Application filed March 8, 1932.   Serial No. 597,637.

The primary object of my invention is the production of a fumigation agent for the extermination and control of pest life, such as insects, vermin and rodents.

An important object of the invention is the production of a fumigation agent adaptable to plant life in fumigating orchards, vineyards and gardens, for example, whether fruit, berries, flowering plants, shrubs, vegetables or the like.

A further object is the production of a fumigation agent readily adaptable for the fumigation of homes and hospitals against infection and contagious diseases; for fumigating goods, wares and merchandise, ships, railroad cars, public and private buildings, stock yards, dairy barns, poultry houses, damp places and for exterminating moths.

A still further object is the production of a fumigation agent for the control and extermination of termites.

A further and important object is the production of a fumigation agent embracing the above characteristics which will impart superior results in the fumigation process by the employment of simple and cheap ingredients, and to afford a novel process by which the ingredients are combined in a manner so as to obtain the most satisfactory results.

To these ends, the composition consists of ground reclaimed rubber, pulverized charcoal, and powdered sulphur mixed dry in the proportions hereinafter recited. The process consists in melting the dry mixture to a fluid state resembling molten lava by simply igniting the same, the mixture being gradually introduced or fed to what I term a burning rack, the latter comprising a partly perforated sheet of metal which may be of any desired size, shape or design, the perforations, too, may be of any desired size or design.

In effecting the present invention, I employ the following composition, it being understood that the proportion refers to parts by volume:

|                          | Parts |
|--------------------------|-------|
| Ground reclaimed rubber  | 1     |
| Pulverized charcoal      | 4     |
| Powdered sulphur         | 15    |

In practice, I use the ordinary commercial grades of charcoal and sulphur, readily obtainable in the open market, while any grade of rubber will suffice the purpose. I will now proceed to describe the manner in which the ingredients are combined for forming the improved fumigation agent.

The mixture in its dry state is delivered to the unperforated portion or section of the burning rack and ignited. The burning mass transforms itself into a heavy fluid substance of the consistency and in appearance quite similar to molten lava. The rack is positioned on an angle, the fluid mass thus flowing onto and over the perforated section, the latter breaking up or attenuating the mass as it contacts therewith. A vessel containing water and functioning as a cooling agent is positioned directly under the perforated surface of the rack, the flowing mass upon contacting the perforations falling therethrough and into the water, the cooling effect of the latter causing the former to clinker and form slags of commingled sulphur, charcoal and rubber.

The slags are removed from the vessel and placed in suitable containers for shipment and use.

In application as a fumigation agent, I employ one pound of dry clinkered slags to fumigate an area approximating 1,000 cu. ft. This quantity of slags is placed in an open mesh metallic basket or container. I immerse the latter containing the slags in water for a second. Upon removing from the water, the latter is permitted to drain off for a few seconds, after which the basket is placed in position for the fumigation process. The slag contents is then ignited, left to burn itself out, and the unit closed against air as tightly as conditions will permit, the tighter, the better, the burning slags emitting a highly detrimental gaseous substance having a materially pronounced effect as a fumigating medium.

Wetting the slags just prior to igniting them for the fumigation process has its beneficial effect in that they burn more slowly and of a greater intensity, due to the rubber therein contained being impervious to water and hence remaining unaffected by the wetting, while at the same time adding a firmer base texture to the slags. In view of the superior effect obtained by thus wetting the slags, I am convinced that this step affords a novel and valuable feature of the process.

Upon the basket's contents having burned itself out, the unit is opened to admit fresh air. On inspection, it will be established that the fumigation process has been of marked success. In practice, I have found that it is an assured destroyer of red scale common to trees of the citrus family and accomplishing, to my knowledge, what no other fumigation process does.

Minor changes in the proportions of the ingredients named and known equivalents may from time to time be substituted for some of the ingredients named without departing from the spirit of the invention.

Having thus described the invention, what I claim as new and valuable features of the process is:

1. The process of manufacturing klinkered slags for fumigating purposes, which consists in mixing together, one part of ground rubber, four parts of pulverized charcoal and fifteen parts of powdered sulphur, placing the mixture on an unperforated portion of a burning rack, thence igniting the mixture and converting to a molten lava state, allowing the same to run over a perforated portion of said burning rack, whereby said molten lava mixture is caused to separate into small particles and to fall through said perforations into a vessel containing water functioning as a cooling agent, cooling said separate particles to form said klinkered slags.

2. The process of manufacturing klinkered slags for fumigating purposes, which consists in mixing together, ground rubber, pulverized charcoal and powdered sulphur, placing the mixture on an unperforated portion of a burning rack, igniting the mixture and converting to a molten lava state, allowing the same to run over a perforated portion of said burning rack, whereby it is caused to separate into small particles and to fall through said perforations into a vessel containing water functioning as a cooling agent to cool said separate particles to form said klinkered slags.

BENJAMIN RUBIN BURGESS.